(No Model.) 4 Sheets—Sheet 1.
F. SIEMENS.
REGENERATIVE GAS FURNACE AND PRODUCER.
No. 501,107. Patented July 11, 1893.
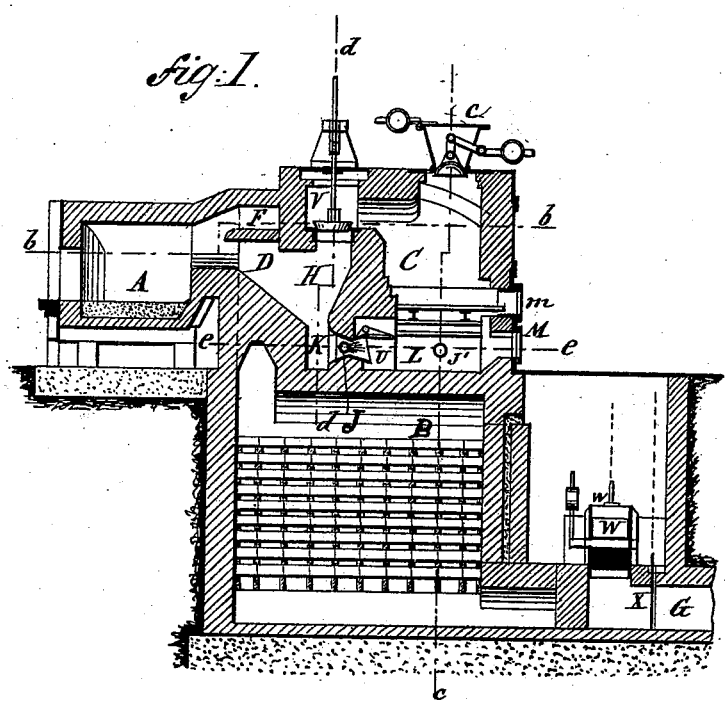
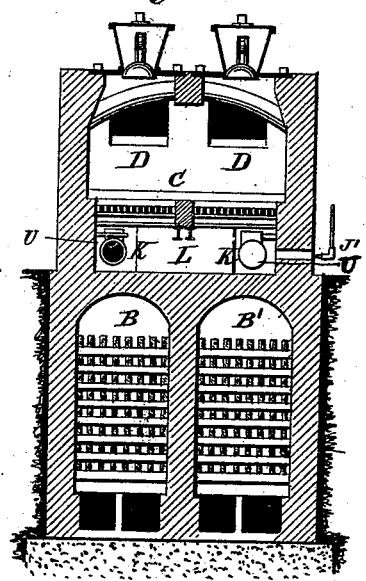
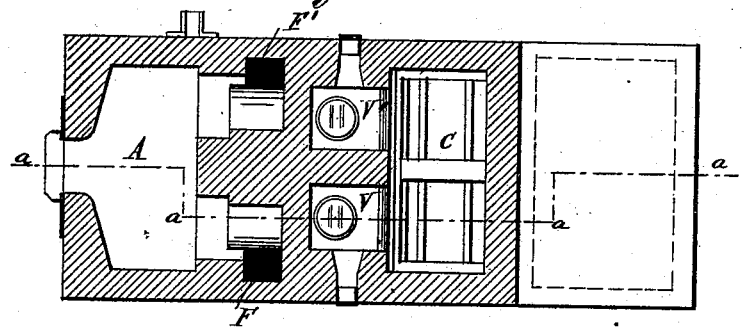
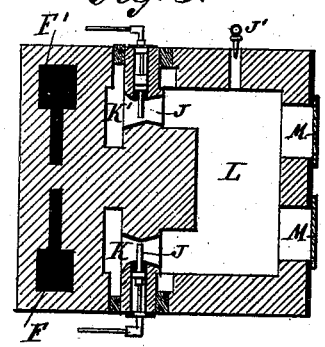
WITNESSES:
Geo. W. Bristol
F. K. Budd
INVENTOR:
Frederick Siemens
BY
Geo. H. Benjamin
ATTORNEY (No Model.) 4 Sheets—Sheet 2.

F. SIEMENS.
REGENERATIVE GAS FURNACE AND PRODUCER.

No. 501,107. Patented July 11, 1893.

WITNESSES:
A. Schehl.
Geo. W. Bristol.

INVENTOR
Frederick Siemens
BY
Geo. H. Benjamin
ATTORNEY.

(No Model.) 4 Sheets—Sheet 3.

F. SIEMENS.
REGENERATIVE GAS FURNACE AND PRODUCER.

No. 501,107. Patented July 11, 1893.

(No Model.) 4 Sheets—Sheet 4.
F. SIEMENS.
REGENERATIVE GAS FURNACE AND PRODUCER.
No. 501,107. Patented July 11, 1893.

WITNESSES:
Geo. W. Bristol
F. K. Budd

INVENTOR:
Frederick Siemens
BY
Geo. H. Benjamin
ATTORNEY

UNITED STATES PATENT OFFICE.

FREDERICK SIEMENS, OF DRESDEN, GERMANY.

REGENERATIVE GAS FURNACE AND PRODUCER.

SPECIFICATION forming part of Letters Patent No. 501,107, dated July 11, 1893.

Application filed January 28, 1891. Serial No. 379,366. (No model.) Patented in England March 16, 1889, No. 4,644.

*To all whom it may concern:*

Be it known that I, FREDERICK SIEMENS, a subject of the King of Saxony, residing at Dresden, in the Empire of Germany, have invented an Improvement in Regenerative Gas Furnaces and Producers, (for which I have obtained Letters Patent of Great Britain, dated March 16, 1889, No. 4,644,) of which the following is a specification.

My invention relates to the construction of regenerative gas furnaces and consists in combining with a suitable combustion or heating chamber, a gas producer or producers placed near to said chamber, and an air regenerator of the reversible type. The gas producer or producers and air regenerator connected to the heating or combustion chamber through two or more separate sets of gas and air flues in which are located reversing valves for altering the direction of the gas and air flowing to the heating or combustion chamber and the outflowing products of combustion therefrom.

My invention further relates to various details of construction which will hereinafter be specifically set forth and described.

The object of my invention is to provide means whereby one portion of the products of combustion may be utilized to aid in heating the fuel in the producer and also that the commingled stream of gas and air delivered into the heating or combustion chamber of the furnace may be brought to a highly heated condition prior to its delivery into the said combustion chamber.

I shall describe my invention as applied to the construction of furnaces for heating metals, also melting and working glass in tanks; but it is to be understood that the invention is applicable to furnaces for puddling, for melting glass and steel in crucibles, or on the open hearth, smelting copper, enameling or other muffles, as well as other furnaces, particularly those requiring intense heat.

Figure 4:
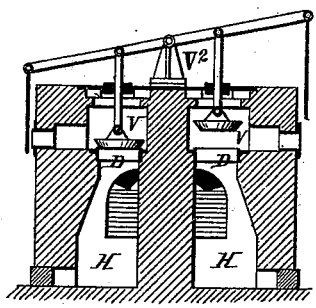
Figure 6:
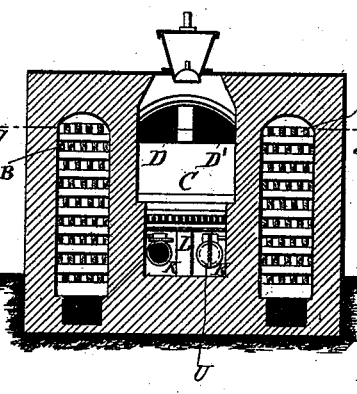
Figure 7:
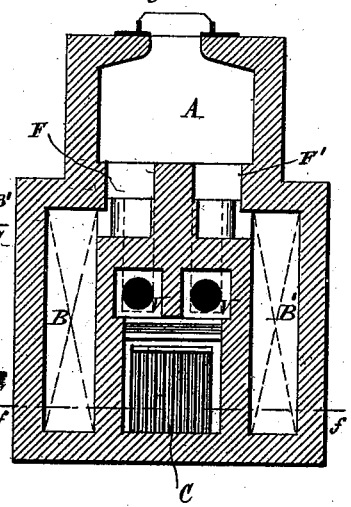
Figure 9:
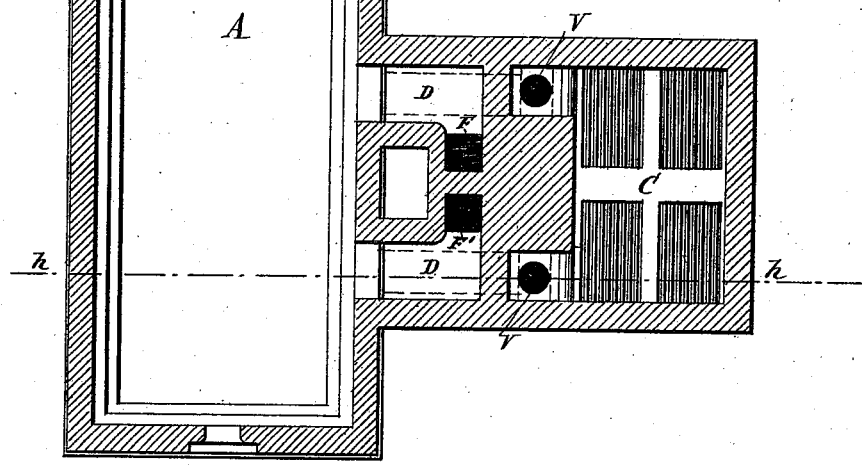
Figure 12:
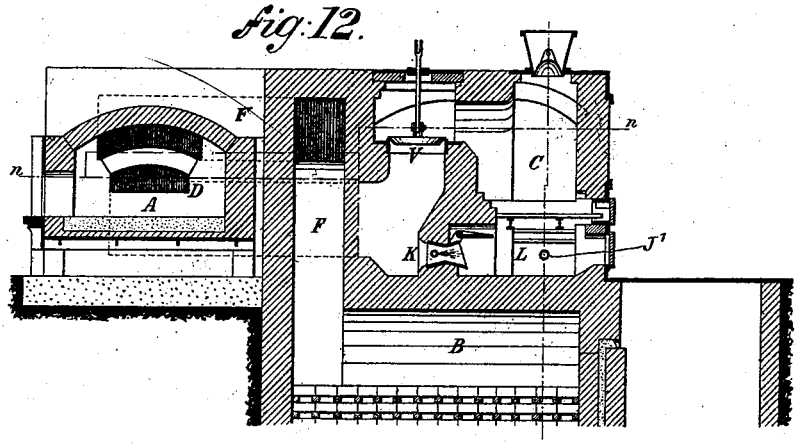
Figure 8:
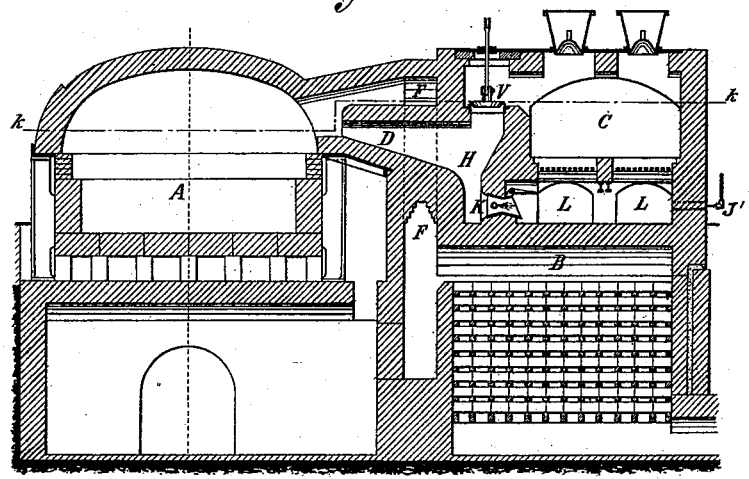
Figure 13:
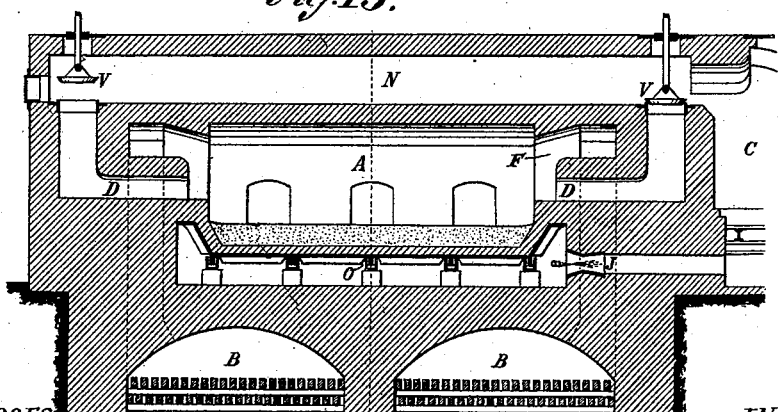
Figure 10:
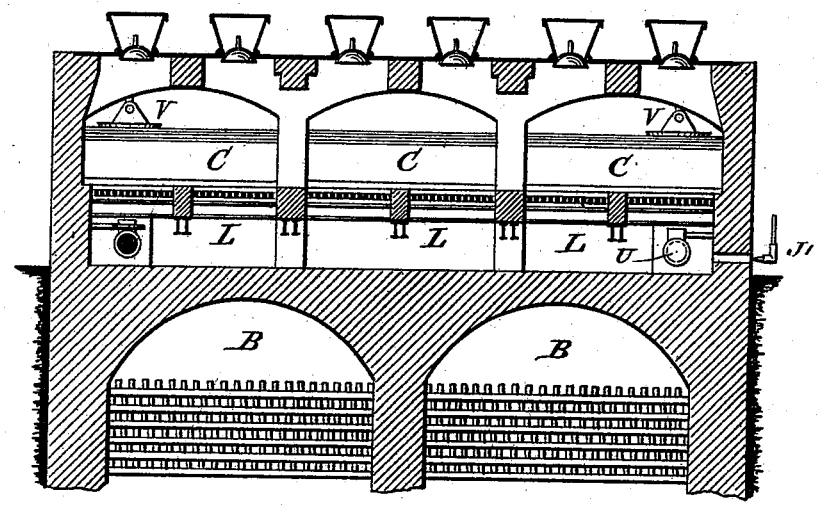
Figure 11:
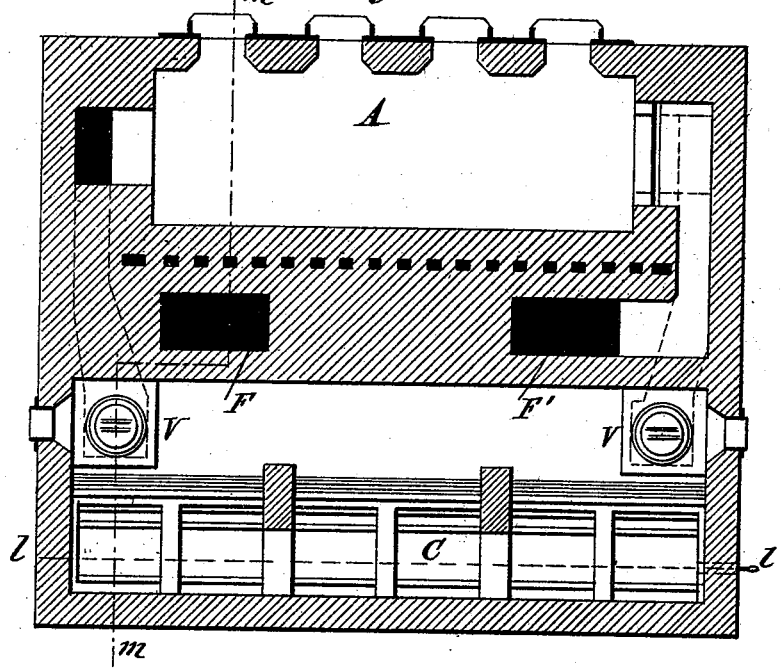

Referring to the accompanying drawings, in which similar letters of reference indicate like parts; Figure 1 is a longitudinal section of a heating furnace taken on the line $a\,a$ of Fig. 2. Fig. 2 is a section on the line $b\,b$ of Fig. 1. Figs. 3 and 4 are vertical sections on the lines $c\,c$ and $d\,d$ respectively of Fig. 1. Fig. 5 is a sectional plan on the line $e\,e$ of Fig. 1. Fig. 6 is a vertical section on the line $f\,f$ of Fig. 7. Fig. 7 is a sectional plan on the line $g\,g$ of Fig. 6, showing a similar furnace with the regenerators situated on each side of the producer instead of below it. Fig. 8 is a section on the line $h\,h$ of Fig. 9. Fig. 9 is a sectional plan on the line $k\,k$ of Fig. 8, of a glass tank furnace. Fig. 10 is a longitudinal section on the line $l\,l$ of Fig. 11. Fig. 11 is a sectional plan on the line $n\,n$ of Fig. 12. Fig. 12 is a section on the line $m\,m$ of Fig. 11, of a furnace with a wide producer; and Fig. 13, is a longitudinal section of a modified form of furnace with the producer situated at one end and communicating with both ends of the combustion or heating chamber.

In the drawings, A is the combustion or heating chamber of the furnace; B B', two regenerative chambers constructed in the usual manner, and shown in Figs. 1, 2, 3, 4, 8, 10 and 11, as situated below the producer; in Fig. 6 and 7, on opposite sides of the producer; and in Fig. 13, as below the combustion or heating chamber.

C is the producer which is placed close to the furnace in one of the several locations shown in the drawings. The producer may be provided with a grate or grates, or the lower portion of the fuel may rest on a solid hearth and have means provided for injection of steam or air. The producer C is connected with the combustion chamber of the furnace by means of the two flues D D', and the regenerative chambers B B' are also connected with the combustion chamber of the furnace by means of the flues F, F'. The arrangement of the flues is such that the gas and air are brought into combination prior to their entrance into the combustion chamber.

In the flues D are the valves V, V' arranged to be operated in the manner shown in Fig. 4; that is to say, when the valve V in the flue D is opened, that in the flue D' will be closed. The valves V, V' are shown mounted to a rock shaft which is pivoted to the standard $V^2$ ranged on the top of the producer. The valves V, V' may be mounted separately and arranged to be operated independently of each other, if desired.

The regenerative chambers B and B' are alternately supplied with air in the usual manner through a reversing valve W, which is provided with a regulating damper plate w. The gas and air directed into the combustion chamber through the flues D and F, as before stated, are combined before entering the chamber and the resultant flame sweeps around the furnace and the products of combustion leave the furnace by the flue F', and from thence pass through the regenerator B', reversing valve W, and opening damper X to the chimney flue G. When the opposite regenerator B has become partially cool by the passage of air through it, and the regenerator B' has become heated by the products of combustion transmitted through it, the valves V, V' and W are reversed so as to reverse the direction of the flame in the furnace, and the action of the regenerators in the usual manner of operating with regenerative gas furnaces.

Instead of operating the furnace in the manner as described, that is, transmitting all of the products of combustion through the regenerators in use, I may proceed in the following manner: Communicating with the two spaces H, H' which intervene between the producer and the flame ports of the furnace I provide the passages K, K' furnished with valves U, U', by which these passages can be closed. The passages K and K' communicate with the spaces L below the producer C. In each of the passages K and K' I provide a steam pipe and a jet nozzle J, by which a jet of steam is directed into the space L, or several jets may be employed. During the time that the products of combustion from the heating chamber A are passing by one of the flues, as for instance, flue F' to regenerator B', the passage K' on the same side of the furnace is opened, and its steam jet is put into action. A portion of the products of combustion, instead of passing down the flue F' of the regenerator B', is thus drawn by injector action of the steam jet through the space H and directed into the space L under the producer. As the products of combustion, consisting of carbon dioxide and nitrogen, pass into the incandescent fuel in the producer, the former takes up an additional portion of carbon whereby it is converted into combustible carbonic oxide, which passes with the other produced gases to the furnace.

M and m are doors giving access to the producer for clinkering and cleaning the apparatus. The valves U, U' in the passages K and K' being closed and the doors M and m being opened, or the doors M and m being closed and an auxiliary jet or jets J' being provided for the admission of air to the spaces L under the grate, the furnace can be operated without passing any of the waste gases through the gas producer, as described.

Instead of employing one or more steam jets for injecting the products of combustion, or air, under or into the producer, an air blast pipe or pipes may be used or other mechanical means employed to create the required currents, and such means may be used separately or conjointly for the purpose of injecting either a portion of the products of combustion, or air, or both.

The glass tank shown in Figs. 8 and 9 differs from the furnace just described only in respect to the form and extent of the heating chamber A, which is in this case arranged as a tank for glass melting and working.

The furnace shown in Figs. 10, 11 and 12 differs from the others only in having a wide producer C and the ports and passages arranged so that the flame is directed into the heating chamber A at the one end of the furnace, the products of combustion passing away at the other end. In these figures, the flue in which the gas reversing valves V and V' are placed, adjoins the gas producer, and in Fig. 13 the flue N is arranged over the crown of the furnace, and the gas producer is placed at one end of the furnace chamber instead of at the back.

In the figures, I have shown two arrangements of flame ports for admitting gas and air into the furnace; but it should be understood that I do not limit myself to those arrangements, or to the method shown of commingling the gas and air at their entrance into the heating chamber, as these specific features form no part of my present invention.

I am aware that a regenerative gas furnace has heretofore been constructed wherein the products of combustion leaving the furnace have been divided into two portions; one portion utilized to heat the air heating regenerators and the other portion to aid in heating the fuel in the producer, and such I do not claim, broadly, as my invention.

I claim as my invention—

1. The combination in a regenerative gas furnace of a combustion chamber, reversible air heating regenerators, a gas producer located in proximity to said combustion chamber and over said regenerators, flues which connect each side of the gas producer at its top with the combustion chamber, valves in said flues, flues which connect the regenerators with the combustion chamber at opposite sides thereof, and flues which connect the combustion chamber with the gas producer at each side of its bottom portion.

2. The combination in a regenerative gas furnace of a combustion chamber, reversible air heating regenerators, a gas producer located in proximity to said combustion chamber and over said regenerators, flues which connect each side of the gas producer at its top with the combustion chamber, valves in said flues, flues which connect the regenerators, with the combustion chamber at opposite sides thereof, flues which connect the combustion chamber with the gas producer at each side of its bottom portion, and a blast pipe in each of said flues near to the producer end thereof.

3. The combination in a regenerative gas furnace of a combustion chamber, a gas producer, occupying substantially the same horizontal level reversible air heating regenerators, flues which connect each side of the gas producer at its top with the combustion chamber, valves in said flues, flues which connect the regenerators with the combustion chamber at opposite sides thereof, flues which connect the combustion chamber with the gas producers at each side of its bottom portion, a blast pipe in each of said flues near to the producer end thereof, and a blast pipe arranged under the hearth or grate of the producer.

4. The combination in a regenerative gas furnace of a combustion chamber, a gas producer, occupying substantially the same horizontal level reversible air heating regenerators, flues which connect each side of the gas producer at its top with the combustion chamber, valves in said flues, flues which connect the regenerators with the combustion chamber at opposite sides thereof, flues which connect the combustion chamber with the gas producers at each side of its bottom portion, a valve in each of said flues near to the producer end thereof, and a blast pipe arranged under the hearth or grate of the producer.

5. The combination in a regenerative gas furnace of a combustion chamber, a gas producer, occupying substantially the same horizontal level reversible air heating regenerators, flues connecting the gas producer with both sides of the combustion chamber, reversing valves in said flues, flues connecting opposite regenerators with opposite sides of the combustion chamber, a flue connecting the space beneath the furnace bed with the bottom of the gas producer and a blast pipe in said flue.

6. The combination in a regenerative gas furnace of a combustion chamber, a gas producer, reversible air heating regenerators, gas flues located over the crown of the furnace and communicating with both sides of the furnace and gas producer, reversing valves in said flues, flues connecting the regenerators with the opposite sides of the combustion chamber and having their port openings over the port openings of the gas flues, a flue connecting the space under the furnace bed with the bottom of the gas producer and a blast pipe in said flue.

7. The combination in a regenerative gas furnace, of a combustion chamber, a gas producer, occupying substantially the same horizontal level reversible air heating regenerators, flues which connect each side of the gas producer at its top with the combustion chamber, valves in said flues, flues which connect the regenerators with the combustion chamber at opposite sides thereof, and flues which connect the combustion chamber with the gas producer at each side of its bottom portion, substantially as described.

8. The combination in a regenerative gas furnace of a combustion chamber, reversible air heating regenerators, a gas producer occupying substantially the same horizontal level, gas flue which connects each side of the gas producer at its top with the respective ends of the combustion chamber, valves in said flue, flue which connects the separate regenerators with the combustion chamber at opposite ends thereof, and flue which connects the gas flue with the gas producer at each side of its bottom portion.

9. The combination in a regenerative gas furnace of a combustion chamber, a gas producer, flues which connect each side of the gas producer at its top and bottom with the combustion chamber, and all included in a single structure occupying substantially the same horizontal level, reversible air heating regenerators, and flues which connect the regenerators with the combustion chamber at opposite sides thereof and said regenerators located below the level occupied by the combustion chamber and gas producer.

In testimony whereof I have signed my name to this specification in the presence of two subscribing witnesses.

FREDERICK SIEMENS.

Witnesses:
  C. MAX HERRMANN,
  CARL HERMANN SCHÜTTER,
    *Both of Dresden, Saxony.*